United States Patent
Schnieders (10) Patent No.: US 12,063,680 B2
(45) Date of Patent: Aug. 13, 2024

(54) REAL TIME ADAPTION OF A LATENCY CRITICAL APPLICATION

(71) Applicant: Deutsche Telekom AG, Bonn (DE)

(72) Inventor: Dominik Schnieders, Aachen (DE)

(73) Assignee: DEUTSCHE TELEKOM AG, Bonn (DE)

(*) Notice: Subject to any disclaimer, the term of this patent is extended or adjusted under 35 U.S.C. 154(b) by 468 days.

(21) Appl. No.: 17/429,378

(22) PCT Filed: Feb. 13, 2020

(86) PCT No.: PCT/EP2020/053707
§ 371 (c)(1),
(2) Date: Aug. 9, 2021

(87) PCT Pub. No.: WO2020/165312
PCT Pub. Date: Aug. 20, 2020

(65) Prior Publication Data
US 2022/0132529 A1    Apr. 28, 2022

(30) Foreign Application Priority Data
Feb. 13, 2019  (EP) ..................... 19156907

(51) Int. Cl.
*H04W 72/56*  (2023.01)
*H04W 4/50*   (2018.01)
(Continued)

(52) U.S. Cl.
CPC ........... *H04W 72/569* (2023.01); *H04W 4/50* (2018.02); *H04W 24/02* (2013.01); *H04W 48/18* (2013.01); *H04W 72/56* (2023.01)

(58) Field of Classification Search
CPC ..... H04W 72/569; H04W 4/50; H04W 72/56; H04W 24/02; H04W 48/18
See application file for complete search history.

(56) References Cited

U.S. PATENT DOCUMENTS

2019/0090229 A1    3/2019  Iwai et al.
2020/0249039 A1*   8/2020  Lassoued ............... G01C 21/20

FOREIGN PATENT DOCUMENTS

JP   2017017655 A      1/2017
WO   WO 2017169061 A1  10/2017

OTHER PUBLICATIONS

Yuyi Mayo, et al., "A Survey on Mobile Edge Computing: The Communication Perspective", IEEE Communications Surveys & Tutorials, Jun. 13, 2017, arXiv:1701.01090v4, pp. 2322-2358, IEEE, New York, USA, XP055517746.

* cited by examiner

*Primary Examiner* — Ronald B Abelson
(74) *Attorney, Agent, or Firm* — Leydig, Voit & Mayer, Ltd.

(57) ABSTRACT

The present disclosure refers to a method comprising: a) selecting an edge computing system (212) of a plurality of edge computing systems each located nearby a respective base station (211) of a wireless network (110) and deployed and managed by a network provider, the selected edge computing system (212) being configured to provision at least one latency critical application (214) which is to be provided to at least one end user device (230) in a cell via the base station (211) serving the cell and located nearby the selected edge computing system (212), b) provisioning, at the selected edge computing system (212), the at least one latency critical application (214) and a service layer radio application (SLRA) (215) for communication with a scheduler associated with the base station (211); c) transferring transmission specific data in real time between the at least one latency critical application (214) and the scheduler associated with the base station (211) via the service layer radio application (SLRA) (215) which is implemented on both, the selected edge computing system (212) and the (Continued)

scheduler, and d) continuously optimizing allocation of resources in the cell by taking into account current status and operation requirements of the at least one latency critical application (214) and/or continuously optimizing current use of the resources in the cell by using those transmission specific data for adapting the at least one latency critical application (214) in real time to current conditions on the cell. The present disclosure also refers to an appropriate system and an appropriate computer-readable medium.

15 Claims, 2 Drawing Sheets

(51) Int. Cl.
*H04W 24/02* (2009.01)
*H04W 48/18* (2009.01)
*H04W 72/566* (2023.01)

REAL TIME ADAPTION OF A LATENCY CRITICAL APPLICATION

CROSS-REFERENCE TO PRIOR APPLICATIONS

This application is a U.S. National Phase application under 35 U.S.C. § 371 of International Application No. PCT/EP2020/053707, filed on Feb. 13, 2020, and claims benefit to European Patent Application No. EP 19156907.8, filed on Feb. 13, 2019. The International Application was published in English on Aug. 20, 2020 as WO 2020/165312 A1 under PCT Article 21(2).

FIELD

The disclosure relates to computer networks, particularly to wireless networks, particularly to mobile networks and, more specifically, to latency critical applications provided within those networks.

BACKGROUND

A network services exchange provider may employ a communication facility, such as a data center, in which multiple customers of the provider locate network, server, and storage gear and interconnect to a variety of telecommunications and other network service provider(s). Data centers may be shared by the multiple tenants having their networking equipment located within the data centers.

With Information Technology (IT) and communications facilities in safe, secure hands, telecommunications, Internet, application service providers, cloud service providers, content providers, and other providers, as well as enterprises, enjoy less latency and the freedom to focus on their core business. Additionally, customers may reduce their traffic back-haul costs and free up their internal networks for other uses.

However, there are some scenarios being realized by server based latency critical applications which require data processing near a respective end user.

Autonomous vehicles, for example, will generate a lot of data. Much of this data will be unstructured and will need to be run through powerful analytics programs to produce actionable data with any value to businesses. Edge computing architectures will help to prioritize what data needs to remain on the edge to be processed by the vehicle's onboard computing power or by any computing device nearby the vehicle and what data should be relayed back to data centers for analysis. Edge data centers will serve a critical role in this network, functioning as a relay station and providing extra computing power for mission critical analytics that need to remain near end users.

In an autonomous vehicle, even a few milliseconds of delay can result in an accident and catastrophic loss of life. The stakes are simply too high to allow the vehicles' networks to be plagued by lag. Self-driving cars need to react immediately to changing road conditions; they can't simply come to a stop while waiting for instructions or recommendations from a distant cloud server analyzing data.

Edge computing can offer a solution to this problem. In fact, the heavy investment in autonomous vehicle research has been one of the reasons so many tech companies are pushing to improve and expand their edge computing architectures. By co-locating servers and computing resources in versatile edge facilities located in both high traffic areas and more far-flung areas with limited bandwidth access, companies can ensure that their autonomous vehicles are able to access the data they need with minimal latency to make decisions quickly. As Internet of Things (IoT) devices, self-driving cars also have the ability to make their own decisions without relying on guidance from servers located in distant data centers.

A further example scenario is given by computer games which experience lag when connecting to a central server and latency could mean the difference between victory and defeat.

Edge computing is not a new concept, but several trends have come together to create an opportunity to turn massive amounts of machine-based data into actionable intelligence closer to the source of the data. Typical edge computing devices typically reside away from a centralize computing available in a cloud.

Edge computing enables analytics and data gathering to occur at or nearby the source of the data. The role of edge computing to date has mostly been used to ingest, store, filter, and send data to cloud systems. Meanwhile, it is also desirable, that edge computing systems are packing more compute, storage, and analytic power to consume and act on the data nearby the end user location.

There are some scenarios where it is useful to bring server based applications closer to terminals, i.e. user equipment (UE) and, thus, to acquire a reduced latency with respect to roundtrip-time (RTT). Specifically, MNOs (Mobile Network Operators) undertake efforts to integrate edge computing in their networks.

However, it is still quite difficult or even impossible to provide latency critical applications via a wireless interface, i.e. a radio interface of a base station of a wireless network as currently used schedulers associated with such a base station operate according to a best effort and fair schedule approach when allocating the available resources on the wireless interface which leads to an inacceptable variance in latency and jitter for any latency critical application.

SUMMARY

In an exemplary embodiment, the present invention provides a method. The method includes: a) selecting an edge computing system of a plurality of edge computing systems each located nearby a respective base station of a wireless network and deployed and managed by a network provider, the selected edge computing system being configured to provision at least one latency critical application which is to be provided to at least one end user device in a cell via a base station serving the cell and located nearby the selected edge computing system; b) provisioning, at the selected edge computing system, the at least one latency critical application and a service layer radio application (SLRA) for communication with a scheduler associated with the base station; c) transferring transmission specific data in real time between the at least one latency critical application and the scheduler associated with the base station via the SLRA, wherein the SLRA is implemented on both the selected edge computing system and the scheduler; and d) optimizing allocation of resources in the cell by taking into account current status and operation requirements of the at least one latency critical application and/or optimizing current use of the resources in the cell by using the transmission specific data for adapting the at least one latency critical application in real time to current conditions on the cell.

BRIEF DESCRIPTION OF DRAWINGS

Subject matter of the present disclosure will be described in even greater detail below based on the exemplary figures.

All features described and/or illustrated herein can be used alone or combined in different combinations. The features and advantages of various embodiments will become apparent by reading the following detailed description with reference to the attached drawings, which illustrate the following.

DETAILED DESCRIPTION

A method is provided, the method comprising:
a) selecting at least one edge computing system of a plurality of edge computing systems each located nearby a respective base station of a wireless network and deployed and managed by a network provider, the selected edge computing system being configured to provision at least one latency critical application which is to be provided to at least one end user device in a cell via the base station serving the cell and located nearby the selected edge computing system,
b) provisioning, at the selected edge computing system, the at least one latency critical application and a service layer radio application (SLRA) for communication with a scheduler associated with the base station;
c) transferring transmission specific data in real time from the at least one latency critical application to the scheduler associated with the base station and/or vice versa from the scheduler to the at least one latency critical application via the SLRA, the service layer radio application (SLRA) being implemented on both, the selected edge computing system and the scheduler, and
d) continuously optimizing allocation of resources in the cell by taking into account current status and operation requirements of the at least one latency critical application and/or continuously optimizing current use of the resources in the cell by using those transmission specific data for adapting the at least one latency critical application in real time to current conditions on the cell.

SLRA can also be implemented on the base station and data received via SLRA are internally forwarded to the scheduler.

Transmission is to be understood within the scope of the present disclosure in a broad sense, particularly as data transmission, i.e. as a transfer of data (a digital bitstream or a digitized analog signal) over a communication channel, such channels can be copper wires, optical fibers, wireless communication channels, storage media and computer buses. In the present disclosure, particularly wireless communication channels are considered.

Data can be represented as electromagnetic signals, such as radio waves, microwaves, an electrical voltage or infrared signal. Data can be represented as packets, frames, bits, information considering all different communication layers.

Transmission specific data comprise, in the case that the transmission specific data are transferred from the at least one latency critical application to the scheduler, application specific data, such as, for example, data about a current operations status and operation requirements of the application (in the following also called context data), and in the case that the transmission specific data are transferred from the scheduler to the at least one latency critical application, data about current conditions on the cell, such as, for example, channel conditions, available resources, throughput, packet delay, queue length, etc.

"Continuously" means that changes concerning data transmission are observed in real time and whenever changes occur which have an impact on data transmission quality the allocation of resources and/or the current use of the resources is optimized regarding those changes.

According to an embodiment, step d) comprises:
e) receiving by the at least one latency critical application via the SLRA and preferably additionally via a further provided application programming interface (API) endpoint of the selected edge computing system, cell specific data from the scheduler of the base station and/or sending by the at least one latency critical application via the SLRA and preferably additionally via a further provided API endpoint of the selected edge computing system, application specific data to the scheduler of the base station; and
f) processing, by the scheduler associated with the base station, the application specific data received from the at least one latency critical application and allocating, by the scheduler, available transmission resources to the at least one latency critical application taking into account the application specific data and the current operation requirements of the at least one latency critical application, and/or
g) processing the cell specific data received from the scheduler of the base station and adapting the at least one latency critical application to the current conditions on the cell taking into account the application specific data and the cell specific data.

The at least one application is specified here as a latency critical application. However, the method and system and computer readable storage medium can also be applied to near or no latency critical applications.

The "scheduler associated with the base station" means that the scheduler can be co-located with the base station or it can be part of the base station or it can be located remotely from the base station for which it operates.

Proximity is defined by a physical proximity (distance) and a logical proximity (hops) between the selected edge computing system and the base station. The reduced latency enables anew class of applications whose complex computing mechanisms can still be run on an external server (the edge computing system) and must not be run on the user equipment, i.e. the end user device, while, nevertheless, real time critical or near real time critical functions can be realized.

The decisive end-to-end latency is defined not only by the location of the edge computing system with respect to the user equipment but also by the latencies within the radio path.

Generally, up to now schedulers are optimized to data throughput for all devices which are connected to the base stations housing the respective schedulers in order to acquire a high spectrum efficiency (Bit/s/Hz), such as algorithm proportional fair, thus, exhausting the limited and valuable resources at the best. However, generally, no differentiation is made between different types of use cases, such as Youtube videos which are buffered, and latency critical applications. Up to now, both, the Youtube videos and the latency critical applications have same priority. This results in that the latency for an application can extremely vary in dependence on the number of connected users, the signal quality etc. Such variance can be recognized via different mean latencies subject to location and time, and also via a respective jitter.

Nowadays, latency critical applications, such as driver assistance systems with the exchange of surroundings models, remote rendering and streaming of AR (artificial reality) and VR (virtual reality) applications, VR360 applications, offloading of computer vision algorithms for drones, vehicles, robots, etc. underlie the normal scheduling. The occurring variance with respect to the mean latency and the jitter impede or even hinder the use of latency critical applications via the radio. Further, a static prioritization or static allocation of resources would reduce the spectrum efficiency and, thus, increase the costs for such latency critical applications.

According to an embodiment, a scheduler associated with the base station prioritizes and/or allocates the available resources to the at least one latency critical application in accordance with the present/current requirements of the at least one latency critical application.

Further, the at least one latency critical application determines in real time on the basis of a present operations status of the at least one latency critical application at least some of the following context data: separated for uplink and downlink: a currently required latency, a maximum required latency, a currently required minimum throughput, maximum error rate, priority, desired duration or number of desired transmissions of this configuration (i.e. for data transfer in the current operations status of the application). These determined context data are then sent by the at least one latency critical application in real time via the SLRA and further probably via an additionally preferably provided API endpoint of the selected edge computing system to the scheduler associated with the base station.

According to a further embodiment, the scheduler associated with the base station dynamically and in real time takes into account the determined context data received from the at least one latency critical application hosted by the selected edge computing system when allocating, prioritizing and reserving the available resources (e.g. resource blocks) for the at least one latency critical application in order to achieve an efficient scheduling (spectrum efficiency with Bits/s/Hz) compared to a static reservation/constant prioritization/reservation of resources for the at least one latency critical application, and in parallel to fulfill the requirements of the at least one latency critical application.

In order to guarantee latencies or maximum latencies, resources have to be prioritized or blocked. In the case of a radio network those resources are resource blocks or resource elements. According to the present invention, the at least one latency critical application hosted by the selected edge computing systems provides the base station, i.e. the scheduler in real time with context sensitive parameters about the at least one latency critical application, such as a current mean latency, the application needs at a present point in time, a maximum latency, a data rate the application needs at the present point in time and further parameters which are useful for the scheduler as reference point for the current state of the at least one latency critical application. These parameters are provided besides other conventional used parameters such as channel condition, historical throughput, packet delay, queue length, etc.

First, the selected edge computing system which can be realized as cloudlet, provisions the at least one latency critical application. Due to the proximity of the selected edge computing system to the scheduler, information can be transmitted between the at least one latency critical application hosted by the selected edge system and the scheduler in real time. Thereby, the at least one latency critical application at the selected edge computing system is logically connected with the radio scheduler associated with the base station via the service layer radio application (SLRA). This enables the scheduler to receive context sensitive information/parameters about and from the at least one latency critical application via this service layer. The at least one latency critical application determines in real time dependent on its current status the mean latency needed at this current point in time, the maximum latency, the data rate needed at this current point in time and further status dependent parameters. The scheduler considers these context sensitive parameters when allocating the available resources: for example, the scheduler provides a higher maximum latency at a point in time t, a lower maximum latency at a point in time t+1, a low maximum latency with a lower data rate at a point in time t+2, a higher maximum latency with a higher data rate at a point in time t+N, etc.

Thus, only resources are prioritized or blocked at a specific point in time for the at least one latency critical application which are really required by the at least one latency critical application at this specific point in time. Thereby, an optimized usage of the spectrum of the radio frequencies is reached while the requirements of the at least one latency critical application are fulfilled.

Thus, for example, a vehicle driving with a low velocity (or in stillstand) can transmit periodically data such as a surroundings model with a higher maximum latency without compromising the driving safety. Conversely, the maximum latency should be reduced when the vehicle is driving with a higher velocity in order to adapt the reaction times within the global system accordingly and to guarantee the driving security.

Particularly, applications with a high data throughput are relevant for the adaptation of the data rate, such as video based applications: a remote rendering of an AR application requires the streaming of video data. Thereby, the data rate can be reduced or has to be increased as a function of the number of rendered objects, the size of the image area, the required resolution for the depth of detail etc.

Due to the provision of the context sensitive parameters/requirements of the at least one latency critical application in real time with respect to maximum latency and data rate, the scheduler can dynamically optimize the distribution and allocation of the radio resources.

Thus, by the knowledge of the current requirements of the at least one latency critical application with regard to maximum latency and data rate (throughput), the scheduler gets more flexible when allocating and reserving the limited resources of the radio spectrum. Thus, the spectrum can be used/exploited more efficiently as by algorithms without knowledge of a current status of the at least one latency critical application. Such conventional algorithms do not at all take latency critical applications into account and new approaches as indicated below consider latency requirements only statically and with a lowest latency or with a mean latency which leads to the above mentioned disadvantages such as unsatisfactory and insufficient exploitation of the radio spectrum.

There are new approaches in the 5G standardization to provide a class of applications with a defined quality of service (QoS), for example via network slicing and/or URLLC (Ultra Reliable Low Latency Communication). Network slicing allows a network operator to provide dedicated virtual networks with functionality specific to a service over a common network infrastructure. Network slicing is a form of virtual network architecture and allows multiple virtual networks to be created on top of a common shared physical infrastructure. The virtual networks are then customized to meet specific needs of applications.

However, all these approaches are based on the assumption of static/unchanging latency and data throughput for a specific application. Thus, the allocation of resources to any application is also static, resulting in an inefficient utilization of resources, particularly in case of critical cell conditions, such as a full cell, bad signal conditions, end user device which is to be provided with a latency critical application being situated at the edge of the cell, etc. Due to the assumption of static latency and throughput for a specific application, non-latency critical applications are supplied, particularly in case of critical cell conditions, worse with resources according to those approaches compared to the method described herein.

According to a further embodiment, the scheduler associated with the base station determines in real time available resources for the at least one latency critical application as a function of a current status of the cell served by the base station, taking into account all connected devices with their applications, latency critical and/or non-latency critical applications, and their requirements and the overall available resources in the cell, derives therefrom a currently attainable individual data throughput and/or a currently attainable individual latency and/or a current individual packet loss for the at least one latency critical application, and sends the currently attainable individual data throughput and/or the currently attainable individual latency and/or the current individual packet loss to the at least one latency critical application via the SLRA and the at least one latency critical application adapts in real time accordingly.

The application adapts to the present status of the base station by adopting itself an appropriate operations status in real time. In that case it is possible that the transmission specific data are only transferred/sent in one direction, namely from the scheduler to the at least one latency critical application.

So far, an application only gets implicitly to know about a change of scheduling. Due to a new allocation of resources at the wireless/radio interface the throughput for an application, for example, can be reduced instantaneously without providing the application with a possibility to adapt itself accordingly. Instead, packets can be queued/buffered or even discarded. This leads to undesired effects within the application and may require repetitions. When using TCP (Transmission Control Protocol) the data rate which is sent, is in the medium term adapted to the new transport conditions. All this leads to jitter and to undesired effects or errors of the respective application.

Instead of an indirect tuning of the application the provided method enables the at least one latency critical application to adapt in real time to a current status of a radio cell which is served by the base station. The at least one latency critical application is running near the base station within the selected edge computing system. Thus, the scheduler within the base station can transmit in real time status information about the radio cell to the at least one latency critical application hosted by the selected edge computing system. Such status information is transmitted via the service layer radio application (SLRA) which logically connects the base station/the scheduler with the selected edge computing system and, thereby, with the at least one latency critical application. The scheduler determines in real time the resources which are available for the at least one latency critical application in terms of resource blocks or resource elements. Therefrom, the possible latency and the data rate on the radio for the at least one latency critical application are derivable. Further parameter, such as packet loss etc. can be determined. The status data "new latency", "new data rate", "packet loss", etc. are transmitted via SLRA in real time to the selected edge computing system and transferred to the at least one latency critical application. The at least one latency critical application can adapt now to the new status information and can capture a new appropriate operations status.

Thus, an autonomous vehicle can reduce its velocity when the latency guaranteed by the base station, i.e. the scheduler is currently increased. Conversely, the vehicle can increase its velocity as soon as the latency is reduced.

With remote rendering a higher compression rate with more image/compression artifacts can be used in order to adapt to a new data rate.

With computer games with a central game server, mechanisms such as interpolation and extrapolation can be reactivated with higher latencies with which higher latencies can be equalized, but which can also lead to errors.

Due to the ideal co-working of scheduler, selected edge computing system and the at least one latency critical application in real time the best possible operations status of the at least one latency critical application which can be currently reached, can be realized.

A continuous over-tuning of the application which can appear with the above mentioned indirect adaption mechanisms (according to the state of the art) leading to an uncontrollable behavior of the application can be avoided.

According to a further embodiment, the method further comprises the step of:
  determining, for the at least one latency critical application, different possible operating points with accordingly different quality stages;
  controlled taking up in real time one of the possible operating points in accordance with a current status of the cell served by the base station concerning required resources for all connected devices.

In a further embodiment each of the possible operating points of the at least one latency critical application is assigned a priority and defined by at least one of the following parameters: minimum throughput downlink, minimum throughput uplink, maximum latency downlink, maximum latency uplink, maximum error rate, desired duration or number of desired transmissions of this configuration.

It is possible that the possible operating points for the at least one latency critical application which are listed in a table of operating points, are sent in real time from the at least one latency critical application hosted by the selected edge computing system to the scheduler of the base station, the scheduler of the base station aggregates all possible operating points of all applications which are currently running via the base station, allocates the available resources accordingly and sends a feedback message to the at least one latency critical application hosted by the selected edge computing system about the finally selected operating point for the at least one latency critical application.

After selection of one of the possible operating points, the scheduler provides the at least one latency critical application temporarily with specific resources, such as maximum latency, minimum throughput with a well-defined Quality of Service (QoS), i.e. a well-defined guarantee. That means that the at least one latency critical application may relay for a specific period of time that the properties of the data transmission correspond to those of the selected operating point. Such properties are guaranteed until a new operating point is selected, triggered by the scheduler and/or the at least one latency critical application according to the embodiments described herein.

In order to guarantee specific properties for data transmission, the scheduler takes appropriate measures such as prioritization, reservation of resources, etc.

The scheduler and the at least one latency critical application are again logically connected via the service layer radio application.

According to the above mentioned embodiment the at least one latency critical application determines as a function of its present status different possible operating points, each representing an allowable solution for the at least one latency critical application. However, the different operating points are assigned different quality stages for the at least one latency critical application, for example via a "graceful degradation".

The different operating points are defined by at least some of the following requirement parameters:
  mean latency
  maximum latency
  data rate/throughput
  maximum error rate
  desired length of the operating point (in milliseconds)
  desired number of transmissions
  priority
  further possible parameters which describe the operation status of the application The possible operating points for the at least one application are defined beforehand by a developer. The aim of such determination of operating points is to perform a substitution of uncontrollable errors and states due to changed latency and throughput by a controlled reduced user experience. If an optimal operating point for the at least one latency critical application due to a full cell or other specific cell conditions not realizable, the controlled adaption of a further allowed operating point is possible.

The decision process about the operating points which are to be taken up in specific scenarios can be subdivided into three stages:
  (a) the developer of the at least one latency critical application defines all possible operating points for the at least one latency critical application when developing the at least one latency critical application,
  (b) the at least one latency critical application decides itself which operating points are eligible in a specific scenario, i.e. in a specific current status of the at least one latency critical application. Thus, for each scenario there is a group of operating points from which one operating point can be selected,
  (c) the scheduler finally decides in real time and dynamically, which operating point of the group of operating points is selected dependent on the current status of the cell.

It is further possible that the at least one latency critical application is adapted to the current status of the cell by adapting/changing its internal parameters such as compression rate, frames per second, etc. which leads to a controlled reduction of quality of the at least one latency critical application, such as compressions artifacts.

The following table gives an example how operating points can be defined for the at least one latency critical application:

| Operation Point No. | Throughput Downlink (Kbit/s) | Max. Latency Downlink (ms) | Throughput Uplink (Kbit/s) | Max. Latency Uplink (ms) | Priority | Description: |
|---|---|---|---|---|---|---|
| 1. | 10.000 | 10 | 5 | 10 | 1 | Optimal operating point for the application => Optimal User Experience |
| 2. | 7.000 | 10 | 5 | 10 | 2 | increased compression rate for streaming => QoS/user experience decrease due to compression artifacts |
| 3. | 10.000 | 20 | 5 | 10 | 3 | Increasing prediction for AR application (via extrapolation of the movement), in order to compensate higher latency => acceptance of more prediction errors |
| 4. | 5.000 | 30 | 5 | 20 | 4 | Further increasing of compression rate and prediction (Extrapolation, Interpolation) => acceptance of more prediction errors, QoS/user experience decrease due to still more compression artifacts |
| 5. | . . . | . . . | . . . | . . . | 6 | . . . |
| 6. | . . . | . . . | . . . | . . . | 7 | . . . |
| 7. | 1000 | 100 | 5 | 100 | 8 | Application at this |

| Operation Point No. | Throughput Downlink (Kbit/s) | Max. Latency Downlink (ms) | Throughput Uplink (Kbit/s) | Max. Latency Uplink (ms) | Priority | Description: |
|---|---|---|---|---|---|---|
| | | | | | | location and this time no more usable => => informing the user in a controlled manner with suggestion of issues (change of location, etc.) |

The possible operating points are transferred together with their respective requirement parameters via the SLRA in real time to the scheduler.

The scheduler aggregates all requirements of all latency critical applications. Then, the scheduler determines the allocation of resources for all user equipment within the cell. Thereby, the scheduler takes into account:

The no latency critical applications within the cell,

The latency critical application within the cell,

Conventional input parameters such as channel condition, historical throughput, packet delay, queue length for each user equipment, Requirement parameters originating from the defined operating points of the latency critical applications.

First, an allocation of resources to all connected devices (latency critical and no latency critical) with requirement parameters indicated with priority 1 of the operating points are examined for realization. Only in the case that a resource shortfall occurs, the alternatives of the further priorities of the operating points are considered until a successful resource allocation is found. Thereby, it is possible to put all latency critical applications equally in their next lower priority stage. Further, any kind of mixed method is possible. An optimization between no latency critical and latency critical applications is possible. When a successful resource allocation is identified the scheduler applies this resource allocation and provides a respective application in real time with a report about the finally selected operating point.

According to a further embodiment, the scheduler associated with the base station and the at least one latency critical application hosted by the selected edge computing system exchange iteratively information for negotiating a best adjustment of the at least one application to present data transmission conditions.

There are two possible alternatives for starting such iterative process.

According to a first alternative, the scheduler associated with the base station sends, as starting point of the negotiation, an initial configuration comprising at least a maximum latency and a data rate to the at least one latency critical application hosted by the selected edge computing system. Thereby, it is possible that the scheduler sends further parameters. Such initial configuration is to be understood as a suggestion on the basis of which further negotiation is to be pursued.

According to a second alternative, the at least one latency critical application hosted by the selected edge computing system sends, as starting point of the negotiation, an initial configuration comprising at least one operating point or a list of possible operating points for the at least one application as starting point of the negotiation to the scheduler associated with the base station. Such initial configuration is to be understood as a suggestion on the basis of which further negotiation is to be pursued.

When receiving the initial configuration the respective party, i.e. the scheduler associated with the base station or the at least one latency critical application hosted by the selected edge computing system, examines the initial configuration and accepts the initial configuration or transmits a proposal for changes to the respective other party, i.e. to the at least one latency critical application hosted by the selected edge computing system or to the base station, particularly to the scheduler associated with the base station. Particularly, the scheduler is often forced to perform iterations as the scheduler which has to control and administrate a plurality of latency critical applications, has to determine the correct operation status, i.e. all of the plurality of latency critical applications have to be supported, i.e. supplied with resources at the best. As the allocation of resources has to consider all latency critical applications simultaneously, usually more cycles between scheduler and the at least one latency critical application provisioned by the selected edge computing system are necessary. This scenario requires a higher reliability of the real time connection (realized by the SLRA) between the scheduler and the at least one latency critical application hosted by the selected edge computing system because more than one communication processes can follow each other. This has an influence on the time the scheduler needs to determine an optimal allocation of the resources.

It is possible that real time events occur which lead to changes in the cell. Such changes can cause changing operation conditions for the at least one latency critical application. In case of such changes in the cell the scheduler associated with the base station covering the cell sends in real time an information about such changes and/or such changing operation conditions via SLRA to the at least one latency critical application hosted by the selected edge computing system. The at least one latency critical application decides about a new subset of operating points which can be adopted by the latency critical application in order to adapt to the changing operation conditions in the cell at best. The at least one latency critical application sends the scheduler a message via SLRA about the new subset of operating points and the scheduler selects one operating point of the new subset of operating points.

Such exchange of transmission specific data between the scheduler and the at least one latency critical application happens in real time preferably at each change in the cell and/or the at least one latency critical application.

Thus, a real time adaption of the parties concerned, such as scheduler/cell and/or application, is reached.

In some scenarios, particularly within an uplink based communication, it is further possible that the above described communication between the scheduler and the at least one latency critical application is directly realized between the scheduler associated with the base station and the at least one latency critical application hosted by/implemented on an end user device/a user equipment (UE). In such scenarios, the user equipment takes over all the above described tasks of the selected edge computing system, i.e. takes the part of the selected edge computing system when executing the method as described before. Thereby, all above described communication is conducted between the scheduler and the end user device/the user equipment.

The present disclosure also provides a system comprising:
a plurality of edge computing systems each located nearby a respective base station of a wireless network and deployed and managed by a network provider, wherein at least one of the selected edge computing systems is configured to be selected to provision at least one latency critical application which is to be provided to at least one end user device in a cell via the base station serving the cell and located nearby the selected edge computing system, wherein the selected edge computing system is configured to provision the at least one latency critical application, a service layer radio application (SLRA) and further preferably an application programming interface (API) endpoint for communication with a scheduler associated with the base station which serves the cell, wherein the selected edge computing system is configured to enable a transfer of transmission specific data in real time from the at least one latency critical application to the scheduler associated with the base station and/or vice versa from the scheduler to the at least one latency critical application via the API endpoint of the selected edge computing system and the service layer radio application (SLRA) which is implemented on both, the selected edge computing system and the scheduler.

The system is configured to execute a method according to any one of the above described embodiments.

The present disclosure further provides a computer readable storage medium comprising instructions that when executed cause one or more processors of a mobile network to:

A) select an edge computing system of a plurality of edge computing systems each located nearby a respective base station of a wireless network and deployed and managed by a network provider, the selected edge computing system being configured to provision at least one latency critical application which is to be provided to at least one end user device in a cell via the base station serving the cell and located nearby the selected edge computing system, B) provision, at the selected edge computing system, the at least one latency critical application, a service layer radio application and preferably further an application programming interface (API) endpoint for communication with a scheduler associated with the base station;

C) transfer transmission specific data in real time from the at least one latency critical application to the scheduler associated with the base station and/or vice versa from the scheduler to the at least one latency critical application via the preferably provided API endpoint of the selected edge computing system and the service layer radio application (SLRA) which is implemented on both, the selected edge computing system and the scheduler, and D) continuously optimize allocation of resources in the cell by taking into account current status and operation requirements of the at least one latency critical application and/or continuously optimize current use of the resources in the cell by using those transmission specific data for adapting the at least one latency critical application in real time to current conditions on the cell.

The details of one or more exemplary embodiments are set forth in the accompanying drawings and the description below. Other features, objects, and advantages of exemplary embodiments will be apparent from the description and drawings, and from the claims.

Figure 1:
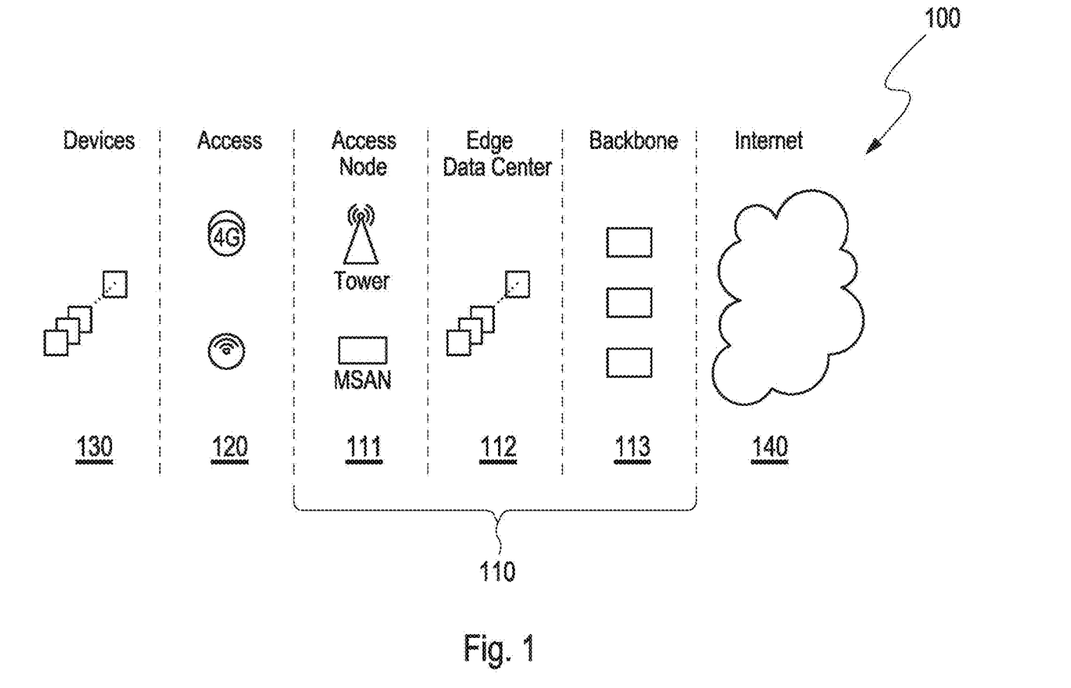
FIG. 1 is a schematic diagram illustrating an example system for edge provisioning of services/applications by a mobile network operator according to an exemplary embodiment.

FIG. 1 is a schematic diagram illustrating an example system 100 incorporating an embodiment of a system. The system 100 comprises a network 110 of a mobile network operator (MNO), an access layer 120 and end user devices 130 which can access the mobile network 110 via the access layer 120. Further the devices 130 can access the Internet 140 via the access layer 120 and the mobile network 110 and, thus, benefit from all services provided by or via the Internet 140.

The mobile network 110 comprises a plurality of access nodes 111, such as a MSAN (Multi-Service Access Node) and/or a cell tower (an antenna support with mobile antennas), a plurality of edge computing systems 112 and a backbone 113 interconnecting the mobile network 110 with the Internet 140.

A mobile network operator (MNO), also known as a wireless service provider is a provider of wireless communications services that owns or controls all the elements necessary to sell and deliver services to an end user including radio spectrum allocation, wireless network infrastructure, back haul infrastructure, provisioning computer systems, etc.

In general, edge devices are normally routers that provide authenticated access (most commonly PPPoA and PPPoE) to faster, more efficient backbone and core networks. The edge computing systems 112 provided according to the present disclosure are made smart, so that the edge computing systems 112 are not only routers, but can include Quality of Service (QoS) and multi-service functions to manage different types of traffic and provision applications, particularly latency critical applications. Each of the plurality of edge computing systems 112 is located nearby at least one base station 111 and, thus, nearby a scheduler co-located or at least associated with the at least one respective base station 111. Due to the physical proximity of each of the edge computing systems 112 to at least one respective base station 111, information between the edge computing systems 112 and the respective neighboring base stations 111 can be transferred in real time. This enables the scheduler associated with a respective base station 111 to allocate in real time available resources to applications which are provisioned by the respective neighboring edge computing systems 112.

Considering a server based latency critical application which is to be provided to an end user device 130, the latency critical application is provisioned by a selected edge computing system 112 which is nearby the base station 111 serving the end user device 130. The scheduler associated with the base station 111 is provided in real time via the selected edge computing system 112 and/or the end user device 130 with application specific data/parameters when allocating resources to the latency critical application. Such application specific parameters are, for example, context sensitive parameters of the latency critical application, such as mean latency, maximum latency and data rate which are currently needed by the latency critical application. The scheduler is provided with further input parameters, such as "channel condition", "historical throughput", "packet delay", "queue length", i.e. with parameters reflecting a current status on/in the cell. As those parameters are provided in real time, the scheduler can consider dynamically requirements of the application which change with time. Thus, the scheduler only blocks resources which are necessary for fulfilling the current requirements of the application in real time. An optimal usage of the spectrum is reached while the latency requirements of the latency critical application are fulfilled at any time.

Figure 2:
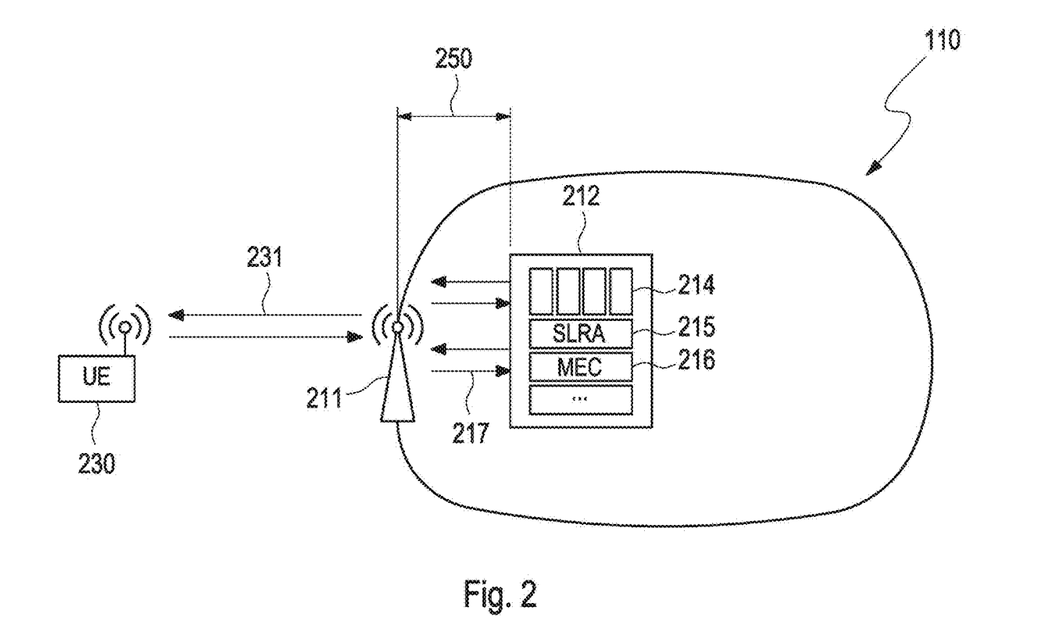
FIG. 2 is a detailed view of FIG. 1 illustrating schematically a data transfer between user equipment, base station and edge computing system according to an exemplary embodiment.

FIG. 2 shows a detailed view of FIG. 1 illustrating schematically a data transfer between a user equipment (UE) 230, a base station 211 and an edge computing system 212 which is located nearby the base station 211 in accordance with embodiments described herein. The user equipment 230 is currently served by the base station 211 because the user equipment 230 is currently positioned within a coverage area of a cell which is served by the base station 211. Thus, data are transferred between the user equipment 230 and the base station 211 as indicated by double arrow 231. Applications which are desired by the user equipment 230 have to be provided via the base station 211. A scheduler associated with the base station 211 has to allocate available resources to all applications and services which are running via the base station 211. In the case that the user equipment 230 is to be provided, for example on demand, with a server based latency critical application, it is proposed by the present disclosure to select the edge computing system 212 as that edge computing system that is located most nearby the base station 211, as indicated by double arrow 250, for that the selected edge computing system 212 provisions the latency critical application 214. The selected edge computing system 212 comprises further a service layer radio application (SLRA) 215 and a computing unit, i.e. a mobile edge computing unit (MEC) 216.

Multi-access Edge Computing (MEC), formerly Mobile Edge Computing, is a network architecture concept that enables cloud computing capabilities and an IT service environment at the edge of the mobile network 110. The basic idea behind MEC is that by running applications and performing related processing tasks closer to the user equipment 230, network congestion is reduced and applications perform better. MEC technology is implemented at the selected edge computing system 212, and enables flexible and rapid deployment of the latency critical application for the user equipment 230. The selected edge computing system 212 is realized as a cloudlet and is logically connected, as indicated by double arrow 217, with the scheduler of the base station 211 via the service layer radio application 215. Via the service layer radio application 215, the scheduler receives in real time context sensitive parameters of the latency critical application 214, such as currently needed mean latency, currently needed maximum latency and currently needed data rate. Thus, the scheduler of the base station 211 can consider those context sensitive data when dynamically allocating resources to the latency critical application 214. Thus, the scheduler can allocate a higher maximum latency at a point in time t, a smaller maximum latency at a point in time t+1, a smaller maximum latency with a smaller data rate at a point in time t+2, a higher maximum latency with a higher data rate at a point in time t+N. Thus, only resources are blocked in real time for the latency critical application 214 which are really currently needed by the latency critical application 214. Therefore, at any time, an optimal usage of the spectrum is reached while latency requirements are simultaneously fulfilled. The base station 211 and the selected edge computing system 212 form part of the mobile network 110 of the mobile network operator, as indicated by circle 110.

Figure 3:
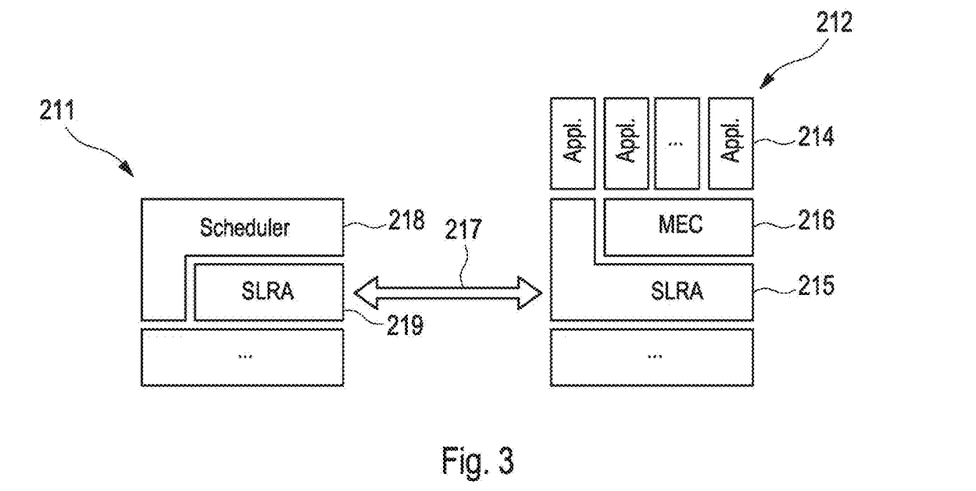
FIG. 3 is a still more detailed view of a base station and a selected edge computing system and a logical connection between the base station and the selected edge computing system according to an exemplary embodiment.

FIG. 3 is a still more detailed view of the base station 211 and the selected edge computing system 212 and the logical connection 217 between the base station 211 and the selected edge computing system 212 in accordance with embodiments described herein. The base station 211 comprises a scheduler 218 and a service layer radio application (SLRA) 219. The logical connection 217 between the base station 211 and the selected edge computing system 212 is realized via the SLRA 215 of the selected edge computing system 212 and the SLRA 219 of the base station 211.

Figure 4:
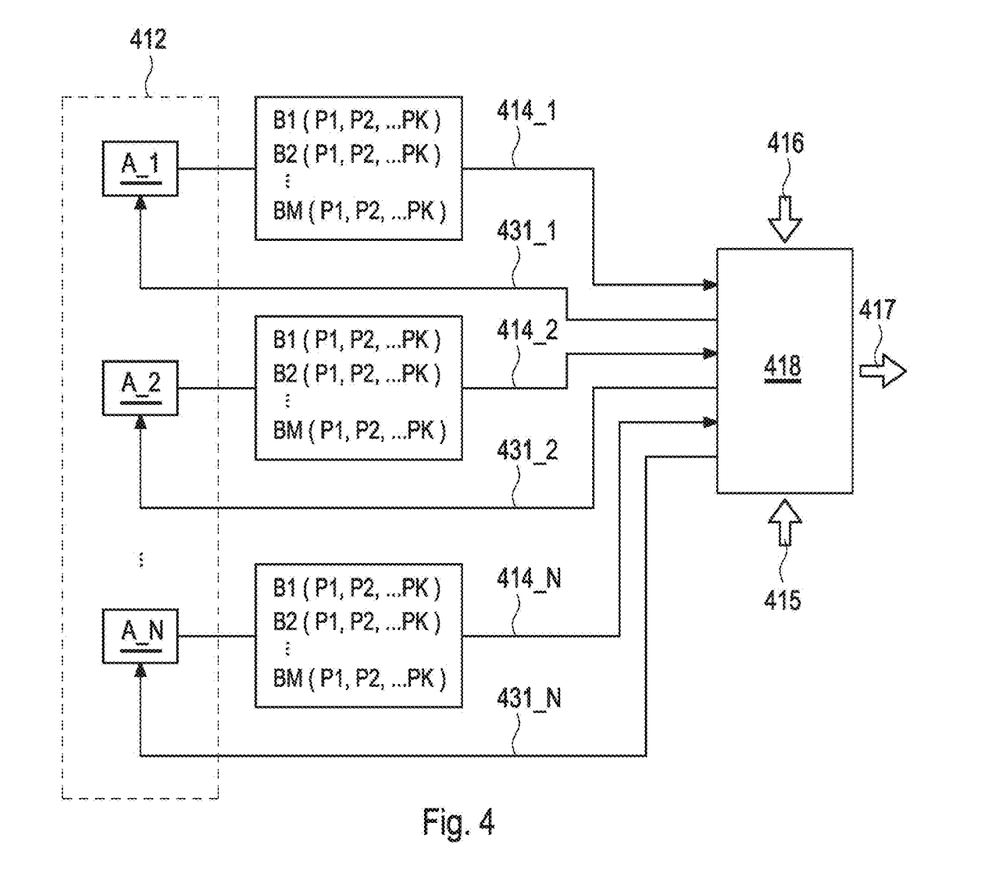
FIG. 4 shows schematically an allocation of resources to a plurality of latency critical applications according to an exemplary embodiment.

FIG. 4 shows schematically an allocation of resources to a plurality of latency critical applications A_1, A_2, . . . , A_N in accordance with embodiments described herein.

FIG. 4 shows a scheduler 418 as part of a base station. The scheduler 418 is configured to allocate dynamically available resources to all different applications A_1, A_2, . . . , A_N running via the base station. Each of those different applications A_1, A_2, . . . , A_N is provided for a user, particularly each for a respective different user. FIG. 4 shows a plurality of different applications A_1, . . . , A_N each application being hosted by a selected edge computing system 412. According to an embodiment, it is envisaged to determine for each application A_1, A_2, . . . , A_N different possible operating points B1, B2, . . . , BM with accordingly different quality stages. Each operating point B1, B2, . . . , BM is defined by a number of parameters P1, P2, . . . , PK. It is now possible, that each application is taking up in real time in a controlled manner one of the possible operating points in accordance with a present status of the base station, i.e. the cell served by the base station. Each of the numbers K, M, N is a positive integer.

Each of the possible operating points is assigned a priority and defined by at least one of the following parameters P1, P2, . . . , PK: throughput downlink, throughput uplink, maximum latency downlink, maximum latency uplink.

The possible operating points B1, B2, . . . , BM for the different applications A_1, A_2, . . . , A_N are sent in real time from the selected edge computing system 412, particularly from the different applications hosted by the selected edge computing system 412 as input parameters, as indicated by arrows 414_1, 414_2, . . . , 414_N, to the base station, i.e. to the scheduler 418. The scheduler 418 also receives classical input parameters 416, such as channel condition, historical throughput and packet delay and queue length, and further input parameters 415. The scheduler 418 of the base station aggregates all possible operating points of all applications which are currently running via the base station, allocates the available resources accordingly and sends a feedback message, as indicated by respective arrows 431_1, 431_2, . . . 431_N, to the respective selected edge computing system 412, particularly to each of the applications A_1, A_2, . . . , A_N hosted by the selected edge computing system 412 about the finally selected operating point for each of the respective applications. Such feedback message can also be sent to the respective end user device of the respective application.

The scheduler 418 and the respective applications A_1, A_2, . . . , A_N are again logically connected via the service layer radio application, respectively.

According to the above mentioned embodiment, each application determines as a function of its present status different possible operating points, which represent an allowable solution for the application, respectively. However, the different operating points are assigned different quality stages for the application, for example via a "graceful degradation".

The different operating points are defined by at least some of the following requirement parameters:
Mean latency
Maximum latency
Data rate/throughput
Maximum error rate
Desired length of the operating point (in milliseconds)
Priority
Further possible parameters which describe the operation status of the application The possible operating points B1, B2, ..., BM for each application A_1, A_2, ..., A_N are defined beforehand by a developer. The operating points B1, B2, ..., BM generally differ from application to application, i.e. generally each application A_1, A_2, ... A_N has its own set of operating points. For the sake of convenience, the operating points for all applications are designated by B1, B2, ..., BM. The same applies to the parameters P1, P2, ... PK. The aim of such determination of operating points is to perform a substitution of uncontrollable errors and states due to changed latency and throughput by a controlled reduced user experience. In the case that an optimal operating point for a respective application, due to a full cell or other specific cell conditions, is not realizable, the controlled adaption of a further allowed operating point is possible.

The following table gives an example how the operating points B1, B2, ..., BM, exemplary M=7, can be defined for each application A_1, A_2, ..., A_N:

| Operating Point No. | Throughput Downlink (Kbit/s) | Max. Latency Downlink (ms) | Throughput Uplink (Kbit/s) | Max. Latency Uplink (ms) | Priority | Description: |
|---|---|---|---|---|---|---|
| B1 | 10.000 | 10 | 5 | 10 | 1 | Optimal operating point for the application => Optimal User Experience |
| B2 | 7.000 | 10 | 5 | 10 | 2 | increased compression rate for streaming => QoS/user experience decrease due to compression artifacts |
| B3 | 10.000 | 20 | 5 | 10 | 3 | Increasing prediction for AR application (via extrapolation of the movement), in order to compensate higher latency => acceptance of more prediction errors |
| B4 | 5.000 | 30 | 5 | 20 | 4 | Further increasing of compression rate and prediction (Extrapolation, Interpolation) => acceptance of more prediction errors, QoS/user experience decrease due to still more compression artifacts |
| B5 | ... | ... | ... | ... | 6 | ... |
| B6 | ... | ... | ... | ... | 7 | ... |
| B7 | 1000 | 100 | 5 | 100 | 8 | Application at this location and this time no more usable => => informing the user in a controlled manner with suggestion of issues (change of location, etc.) |

The possible operating points B1, B2, ..., BM are transferred together with their respective requirement parameters via the SLRA in real time to the scheduler 418.

The scheduler 418 aggregates all requirements of all latency critical applications. Then, the scheduler determines the allocation of resources for all user equipment within the cell, as indicated by arrow 417. Thereby, the scheduler 418 takes into account:

The no latency critical applications within the cell,
The latency critical application within the cell,
Conventional input parameters such as channel condition, historical throughput, packet delay, queue length for each user equipment,
Requirement parameters originating from the defined operating points of the latency critical applications.

First, an allocation of resources to all devices (latency critical and no latency critical) with requirement parameters indicated with priority 1 of the operating points B1, B2, ..., BM are examined for realization. Only in the case that a resource shortfall occurs, the alternatives of the further priorities of the operating points B1, B2, ..., BM are considered until a successful resource allocation 417 is found. Thereby, it is possible to put all latency critical applications equally in their next lower priority stage. Further, any kind of mixed method is possible. An optimization between no latency critical and latency critical applications is possible. When a successful resource allocation 417 is identified the scheduler 418 applies this resource allocation and provides a respective application in real time with a report about the finally selected operating point.

According to a further embodiment, the scheduler and the respective applications hosted by a respective edge computing system exchange iteratively information for negotiating a best adjustment of all applications to present data transmission conditions within the respective cell.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100 system
110 wireless network
120 access layer
130 end user device
140 Internet
111 access node(s)
112 edge computing system(s)
113 backbone
211 base station
212 edge computing system
214 latency critical application
215 service layer radio application (SLRA)
216 mobile edge computing unit (MEC)
217 double arrow
218 scheduler
219 service layer radio application (SLRA)
230 user equipment, end user device
231 double arrow
250 double arrow
414_1, 414_2, ..., 414_N arrows
415 further input parameters
416 classical input parameters
417 resource allocation
418 scheduler
430_1, 430_2, ... 430_N arrows
A_1, A_2, ..., A_N latency critical application
B1, B2, ..., BM operating points
P1, P2, ..., PK parameters

The invention claimed is:

1. A method comprising:
a) selecting an edge computing system of a plurality of edge computing systems each located nearby a respective base station of a wireless network and deployed and managed by a network provider, the selected edge computing system being configured to provision at least one latency critical application which is to be provided to at least one end user device in a cell via a base station serving the cell and located nearby the selected edge computing system;
b) provisioning, at the selected edge computing system, the at least one latency critical application and a service layer radio application (SLRA) for communication with a scheduler associated with the base station;
c) transferring transmission specific data in real time between the at least one latency critical application and the scheduler associated with the base station via the SLRA, wherein the SLRA is implemented on both the selected edge computing system and the scheduler; and
d) optimizing allocation of resources in the cell by taking into account current status and operation requirements of the at least one latency critical application and/or optimizing current use of the resources in the cell by using the transmission specific data for adapting the at least one latency critical application in real time to current conditions on the cell;
wherein the method further comprises:
determining, for the at least one latency critical application, different possible operating points with accordingly different quality stages; and
controlledly taking up in real time one of the possible operating points in accordance with a current status of the cell served by the base station concerning required resources for all connected devices.

2. The method according to claim 1, wherein step d) comprises:
e) receiving, by the at least one latency critical application via the SLRA, cell specific data from the scheduler of the base station and/or sending, by the at least one latency critical application via the SLRA, application specific data to the scheduler of the base station; and f) processing, by the scheduler associated with the base station, the application specific data received from the at least one latency critical application and allocating, by the scheduler, available transmission resources to the at least one latency critical application taking into account the application specific data and the current operation requirements of the at least one latency critical application; and/or g) processing the cell specific data received from the scheduler of the base station and adapting the at least one latency critical application to the current conditions on the cell taking into account the application specific data and/or the cell specific data.

3. The method according to claim 1, wherein the at least one latency critical application
determines in real time on the basis of its current status at least some of the following context data, separated for uplink and downlink: a currently required latency, a maximum required latency, a currently required minimum throughput, a maximum error rate, a priority, a desired duration, or a number of desired transmissions for data transfer; and
sends in real time via the SLRA the determined context data to the scheduler associated with the base station.

4. The method according to claim 3, wherein the scheduler associated with the base station dynamically and in real time takes into account the determined context data received from the at least one latency critical application hosted by the selected edge computing system when prioritizing and allocating the available resources in order to achieve efficient scheduling and in parallel to fulfill the requirements of the at least one latency critical application on the selected edge computing system according to the real time status of the at least one latency critical application.

5. The method according to claim 1, wherein the scheduler associated with the base station determines in real time available resources for the at least one latency critical application as a function of the current status of the cell served by the base station, taking into account all connected devices with their applications and their requirements and the overall available resources in the cell, derives therefrom a currently attainable individual data throughput and/or a currently attainable individual latency and/or a current individual packet loss for the at least one latency critical application, and sends the currently attainable individual data throughput and/or the currently attainable individual latency and/or the current individual packet loss to the at least one latency critical application, and the at least one latency critical application adapts in real time accordingly.

6. The method according to claim 5, wherein the at least one latency critical application adapts in real time to the current status of the cell served by the base station by adopting itself an appropriate operations status according to the transmitted currently attainable individual data throughput and/or the currently attainable individual latency and/or the current individual packet loss for the at least one latency critical application.

7. The method according to claim 5, wherein the scheduler associated with the base station dynamically and in real time takes into account the determined context data received from the at least one latency critical application hosted by the selected edge computing system when allocating, prioritizing and reserving the available resources for the at least one latency critical application in order to achieve efficient scheduling compared to a static reservation of resources for the at least one latency critical application, and in parallel to fulfill the requirements of the at least one latency critical application.

8. The method according to claim 1, wherein each of the possible operating points of the at least one latency critical application is assigned a priority and defined by at least one of the following parameters: minimum throughput downlink, minimum throughput uplink, maximum latency downlink, maximum latency uplink, maximum error rate, desired duration, or number of desired transmissions for a data transfer.

9. The method according to claim 1, wherein the possible operating points for the at least one latency critical application which are listed in a table of operating points, are sent in real time from the at least one latency critical application hosted by the selected edge computing system to the scheduler of the base station, the scheduler of the base station aggregates all possible operating points of all applications which are currently running via the base station, allocates the available resources accordingly, and sends a feedback message to the at least one latency critical application hosted by the selected edge computing system about the finally selected operating point for the at least one latency critical application, and the at least one latency critical application adapts in real time accordingly.

10. The method according to claim 1, wherein the scheduler of the base station and the at least one latency critical application of the selected edge computing system exchange iteratively information for negotiating a best adjustment of the at least one latency critical application to current data transmission conditions in terms of spectrum efficiency and the fulfillment of the requirements of the at least one latency critical application within possible operating points of the at least one latency critical application.

11. The method according to claim 10, wherein the scheduler of the base station sends, as a starting point of the negotiation, an initial configuration comprising at least a maximum latency and a data rate to the at least one latency critical application hosted by the selected edge computing system.

12. The method according to claim 10, wherein the at least one latency critical application of the selected edge computing system sends, as a starting point of the negotiation, an initial configuration comprising at least one operating point or a list of possible operating points for the at least one latency critical application to the scheduler of the base station.

13. The method according to claim 1, wherein, in case of real time changes in the cell, the scheduler associated with the base station covering the cell sends in real time an information about such changes and/or such changing operation conditions via SLRA to the at least one latency critical application hosted by the selected edge computing system, the at least one latency critical application decides about a new subset of operating points which can be adopted by the latency critical application in order to adapt to the changing operation conditions in the cell at best and sends the scheduler a message via the SLRA about the new subset of operating points, and the scheduler selects one operating point of the new subset of operating points.

14. A system, comprising:
a plurality of edge computing systems, each located nearby a respective base station of a wireless network and deployed and managed by a network provider, wherein at least one of the edge computing systems is configured to be selected to provision at least one latency critical application which is to be provided to at least one end user device in a cell via a base station serving the cell and located nearby the selected edge computing system;

wherein the selected edge computing system is configured to provision the at least one latency critical application and a service layer radio application for communication with a scheduler associated with the base station which serves the cell;

wherein the selected edge computing system is configured to enable an exchange of transmission specific data in real time between the at least one latency critical application and the scheduler associated with the base station via an application programming interface (API) endpoint of the selected edge computing system and a service layer radio application (SLRA), wherein the SLRA is implemented on both the selected edge computing system and the scheduler;

wherein the scheduler is configured to: determine, for the at least one latency critical application, different possible operating points with accordingly different quality stages; and wherein the at least one latency critical application is configured to: controlledly take up in real time one of the possible operating points in accordance with a current status of the cell served by the base station concerning required resources for all connected devices.

15. One or more non-transitory computer-readable storage mediums having instructions stored thereon, wherein the instructions, when executed, facilitate:

A) selecting an edge computing system of a plurality of edge computing systems each located nearby a respective base station of a wireless network and deployed and managed by a network provider, the selected edge computing system being configured to provision at least one latency critical application which is to be provided to at least one end user device in a cell via a base station serving the cell and located nearby the selected edge computing system;

B) provisioning, at the selected edge computing system, the at least one latency critical application and a service layer radio application for communication with a scheduler associated with the base station;

C) transferring transmission specific data in real time between the at least one latency critical application and the scheduler associated with the base station via an application programming interface (API) endpoint of the selected edge computing system and a service layer radio application (SLRA), wherein the SLRA is implemented on both the selected edge computing system and the scheduler; and D) optimizing allocation of resources in the cell by taking into account current status and operation requirements of the at least one latency critical application and/or optimizing current use of the resources in the cell by using the transmission specific data for adapting the at least one latency critical application in real time to current conditions on the cell;

wherein the instructions, when executed, further facilitate:

determining, for the at least one latency critical application, different possible operating points with accordingly different quality stages; and controlledly taking up in real time one of the possible operating points in accordance with a current status of the cell served by the base station concerning required resources for all connected devices.

* * * * *